United States Patent
Fauqueur et al.

(10) Patent No.: US 10,043,550 B2
(45) Date of Patent: *Aug. 7, 2018

(54) SYSTEM AND METHOD OF PRODUCING CERTAIN VIDEO DATA

(71) Applicant: MirriAd Advertising Limited, London (GB)

(72) Inventors: Julien Fauqueur, Beckenham (GB); Simon Cuff, London (GB); Philip McLauchlan, Surrey (GB)

(73) Assignee: Mirriad Advertising PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/091,308

(22) Filed: Nov. 26, 2013

(65) Prior Publication Data

US 2014/0147096 A1    May 29, 2014

(30) Foreign Application Priority Data

Nov. 27, 2012 (GB) .................................. 1221328.6

(51) Int. Cl.
*H04N 9/80* (2006.01)
*H04N 5/445* (2011.01)
(Continued)

(52) U.S. Cl.
CPC ............ *G11B 27/10* (2013.01); *G11B 27/036* (2013.01); *H04N 5/44* (2013.01); *H04N 5/4401* (2013.01); *H04N 21/812* (2013.01)

(58) Field of Classification Search
CPC ........ H04N 27/036; H04N 27/10; H04N 5/14; H04N 5/20; H04N 5/265; G06F 3/00; G06F 17/30569; G06T 2207/20221
(Continued)

(56) References Cited

U.S. PATENT DOCUMENTS 5,283,639 A * 2/1994 Esch et al. ...................... 725/32
8,606,744 B1 * 12/2013 Dageville ........... G06F 17/3038
707/602

(Continued)

FOREIGN PATENT DOCUMENTS

WO    2006077536 A2    7/2006
WO    2008010203 A2    1/2008
WO    2008062211 A1    5/2008

*Primary Examiner* — Thai Tran
*Assistant Examiner* — Syed Hasan
(74) *Attorney, Agent, or Firm* — Maschoff Brennan

(57) ABSTRACT

A system and method of incorporating additional video objects into source video data to produce output video data. A method includes identifying segments of the source video data, selecting identified segments for the inclusion of additional video objects, creating an intermediate working version of the source video data including video material corresponding to the selected segments, creating metadata which identifies at least one frame within the source video data which corresponds to the selected segments, transmitting the intermediate working version to a remote system for the creation of additional video data including additional video objects to be included in the output video data, receiving video file data associated with the additional video data, obtaining the additional video data based on the video file data, retrieving metadata and incorporating the additional video data with the source video data on the basis of the retrieved metadata to produce the output video data.

19 Claims, 10 Drawing Sheets

(51) Int. Cl.
*H04N 7/025* (2006.01)
*H04N 9/64* (2006.01)
*H04N 9/74* (2006.01)
*G06F 7/10* (2006.01)
*G06G 5/00* (2006.01)
*G11B 27/10* (2006.01)
*G11B 27/036* (2006.01)
*H04N 21/81* (2011.01)
*H04N 5/44* (2011.01)

(58) Field of Classification Search
USPC .......... 386/250; 345/636, 634; 348/727, 348/E7.049, 571, 584; 707/999.104, 602; 725/32, 39, 67, 68, 38
See application file for complete search history.

(56) References Cited

U.S. PATENT DOCUMENTS

| | | | |
|---|---|---|---|
| 2007/0120873 A1* | 5/2007 | Relan | G11B 27/034 345/634 |
| 2007/0299870 A1* | 12/2007 | Finch | 707/104.1 |
| 2008/0126226 A1 | 5/2008 | Popkiewicz | |
| 2008/0304805 A1 | 12/2008 | Baharav et al. | |
| 2009/0009532 A1* | 1/2009 | Hallberg | 345/636 |
| 2009/0265737 A1* | 10/2009 | Issa | G06F 17/30817 725/38 |
| 2010/0188580 A1* | 7/2010 | Paschalakis | G06F 17/30802 348/571 |
| 2011/0188836 A1 | 8/2011 | Popkiewicz | |

\* cited by examiner

SYSTEM AND METHOD OF PRODUCING CERTAIN VIDEO DATA

CROSS-REFERENCE TO RELATED APPLICATIONS

This application claims priority under 35 U.S.C. § 119 to GB Application No. 1221328.6, filed Nov. 27, 2012, the entire content of which is hereby incorporated by reference in its entirety.

BACKGROUND OF THE INVENTION

Field of the Invention

The present application relates to producing video data. In particular, but not exclusively, the present application relates to methods for, and for use in, incorporating one or more additional video objects into source video data to produce output video data, to computer programs, computer program products arranged and systems may comprise a system and/or apparatus configured to perform these methods.

Description of the Related Technology

The television broadcast industry has changed significantly in recent years. Prior to these changes, television programs were often recorded on video tape, either in a television studio or on location. With videotape there is no file structure; just linear picture information. The availability of digital technologies has resulted in media which are structured with directories and files. The number of processes between raw captured material and the final material is constantly increasing as, in the file-based domain, it is possible to create workflows by concatenating several processes.

Up until recently, branded products could be incorporated into video material by physical or prop placement at the time the video material was recorded to generate revenue for the content producer and content provider via product placement. If it were desired to include a product in a given scene, the physical product, or a very good facsimile, would have to be placed in the scene when it was recorded. Whilst this was very simple, it was highly inflexible.

With digital file processing, many new processes become possible that can be used to embed a branded product within a scene retrospectively. This may involve digitally post-processing a captured scene to add a representation of, for example, a branded drinks container on a table or shelf.

A known system describes a system that allows key frames of a video content item to be identified, such as low value frames, high value frames and product placement frames. Advertisements such as advert frames may be inserted in to a sequence of key frames of the video content item, for example before or after one or more high value frames or by modifying one or more of the high value frames to include an advertisement. The key frame sequence including the advertisements can then be published for viewing by others.

It would be desirable to provide improved arrangements for producing video data.

SUMMARY

In accordance with one or more embodiments, a method of incorporating one or more additional video objects into source video data to produce output video data is provided. The method may include retrieving the source video data and identifying segments of the source video data. The method may further include selecting one or more of the identified segments within the source video data for the inclusion of one or more additional video objects and creating an intermediate working version of the source video data, the intermediate working version including at least video material corresponding to the selected one or more segments. Metadata which identifies at least one frame within the source video data which corresponds to the selected one or more segments is created. At least the intermediate working version may then be transmitted to a remote system for the creation of additional video data including the one or more additional video objects to be included in the output video data. The method may further include receiving video file data associated with the additional video data after the additional video data has been created using the intermediate working version transmitted to the remote system and obtaining the additional video data based on the video file data. The method may also include retrieving metadata which identifies at least one frame within the source video data corresponding to the additional video data and incorporating the additional video data with at least part of the source video data at least in part on the basis of the retrieved metadata to produce the output video data.

As a distributed network is used for incorporating additional video objects with source video data, the process is afforded greater flexibility and security. The intermediate working version is not necessarily in the same order as the source video data, allowing for similar segments to be grouped together, simplifying the process of adding in additional video data, and reducing the risk of the video content may be exposed prior to airing.

In some embodiments, the intermediate working version contains a reduced amount of video material compared to the source video data. This reduces the data transmitted and received, and means that unnecessary processing of segments that will not include the additional video objects does not occur. As the quantity of data transferred is decreased, the corresponding time and bandwidth requirements for transmitting and receiving the data are reduced.

In some embodiments, the intermediate working version includes the selected one or more of the identified segments, and does not include one or more of the identified segments which are not selected for the inclusion of one or more additional video objects. By not sending all of the source video data, the information disclosed is restricted to the intermediate working version.

In some embodiments, the source video data is stored on a data store in a local area network in which the intermediate working version and the metadata are created, wherein the remote system is connected to the local area network via the Internet, and wherein the step of transmitting the intermediate working version to the remote system may comprise transmitting the intermediate working version to the remote system via the Internet. The integrity of the source video data is even more relevant in transmissions over the Internet and is increased by transmitting the intermediate working version rather than the source video data. In addition, bandwidth requirements and transmission times are reduced.

In some embodiments, the method may comprise transmitting the metadata which identifies the at least one frame within the source video data which corresponds to the selected one or more segments to the remote system. A potential advantage of this is that the intermediate working version can allow for similar segments to be grouped together, benefiting the process of adding in additional video data.

In some embodiments, the method may also comprise receiving the metadata which identifies at least one frame within the source video data which corresponds to the additional video data. As the metadata identifies the at least one frame within the source video data which corresponds to the selected one or more segments to the remote system, the received additional video data can be incorporated in the correct location of the source video data.

In some embodiments the method may be used in a system including a plurality of remote systems which are capable of processing video data related to the creation of the additional video data before it is received for incorporation with the source video data, the method may comprise generating remote system identification data identifying one or more remote systems which are to be involved in the processing of video data related to the creation of the additional video data; and transmitting the remote system identification data to the remote system used for the creation of the additional video data. A potential advantage of transmitting the intermediate working version of the source video data to a remote system for the inclusion of additional video data is that it allows more capacity for the original system to perform other tasks. The remote system may be dedicated to the generation of additional video data and hence, have the expertise and capabilities to perform this task efficiently.

In some embodiments, the method may comprise transmitting the remote system identification data to the remote system along with the intermediate working version facilitating transferring the necessary information between remote systems.

In some embodiments, the remote system identification data may comprise data identifying one or more tasks to be performed by the identified remote systems, reducing the requirement for user interaction.

In some embodiments, the video file data may comprise instructions for generating the additional video data and wherein obtaining the additional video data based on the video data file may comprise generating the additional video data using the instructions. Generating the additional video data using the instructions allows for a reduction in the amount of data transferred between remote systems as instructions can be transmitted in lieu of additional video data.

In some embodiments the additional video data may comprise video overlay data for generating video overlay material for incorporation with the source video data to produce the output video data. As the additional data may comprise overlay data, it can be viewed in conjunction with the source video data to provide an in context video of the additional video object. This allows for in context checks to be carried out by users.

In some embodiments, the additional video data may comprise video overlay data for generating a plurality of video overlays for incorporation with the source video data to produce the output video data. As there is a plurality of video overlays, each overlay can be viewed with the source video data independently. This allows for multiple users to view different versions of the video data, increasing the control of the privacy of the video data.

In some embodiments, the method may comprise transmitting the source video data to a remote system which is different from the remote system used for the generation of the additional video data, and incorporating the received additional video data with the source video data at the different remote system.

By incorporating the received additional video data with the source data at a different system from the one in which the source video data was originally located, the output video file may be located in a remote location that is more beneficial than the original location of the source video, such as the territory in which the video is intended for broadcast or publication.

In some embodiments, the method may comprise carrying out a quality control check at a remote system which is different from the remote system used for the generation of the additional video data, allowing for the quality control check to be carried out in a suitable location. It may be that persons with expertise for carrying out the quality control check are located in a different location the one in which the additional video data is generated.

In some embodiments, the one or more additional objects comprise one or more digitally placed products allowing video producers to sell advertising opportunities to advertisers.

In some embodiments, the method may comprise analyzing the source video data to identify the segments of the source video data. This allows the user control in the analyzing process over which segments are selected, and segments suitable for additional video objects can be used.

In some embodiments, the method may comprise receiving the additional video data from a remote system which is different from the remote system used for the generation of the additional video data. This allows a logical separation of the remote systems used for the production of additional video data, for example, the QC check may be carried out at a remote system different from the one used for the generation of the additional video data.

Further features of the application will become apparent from the following description of preferred embodiments of the application, given by way of example only, which is made with reference to the accompanying drawings.

DETAILED DESCRIPTION OF CERTAIN INVENTIVE EMBODIMENTS

Figure 1:
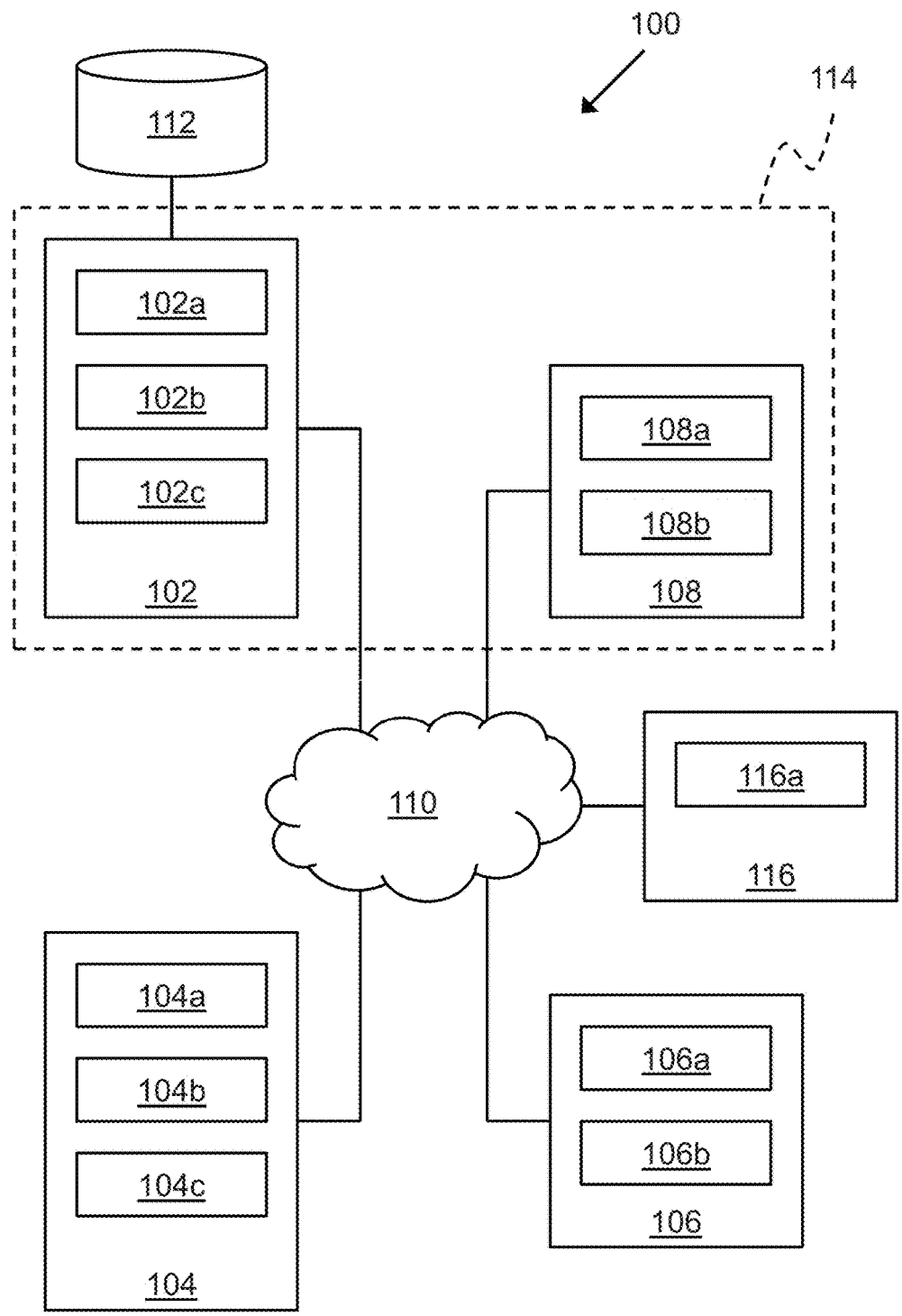
FIG. 1 is a schematic diagram showing a system in accordance with some embodiments.

FIG. 1 is a schematic diagram showing a video processing system 100 in accordance with some embodiments.

The video processing system 100 includes four subsystems 102, 104, 106, 108 (referred to herein as "hubs"). Each hub performs one or more video processing tasks or functions within the video processing system 100. Each hub 102, 104, 106, 108 is situated in one or more geographical locations. In some embodiments, each of the hubs 102, 104, 106, 108 may comprise computer hardware which has access to a local data storage system and a cluster of Graphics Processing Unit (GPU)-enabled computers for video processing. It is known that video processing can be carried out on alternatives to GPUs and embodiments should not be understood as being limited to carrying out the video processing on GPUs only.

Each hub 102, 104, 106, 108 is connected to one or more other of the hubs 102, 104, 106, 108 via one or more data communication networks 110. In some embodiments, the hubs 102, 104, 106, 108 are connected to each other via the Internet. The hubs 102, 104, 106, 108 may each be located on a different Local Area Network (LAN). The LANs may be interconnected by a Virtual Private Network (VPN); a private network that uses the one or more data communication networks 110 to connect the hubs 102, 104, 106, 108 together securely over a potentially insecure network such as the Internet. Alternatively, some or all of the hubs 102, 104, 106, 108 may be interconnected using leased lines or other private network connections.

Hub 102, which is referred to herein as the "source" hub, performs, amongst other things, video data capture and video data analysis in the video processing system 100.

The source hub 102 may retrieve source video data as one or more digital files, supplied, for example, on video or data tape, on digital versatile disc (DVD), over a high-speed computer network, via the network 110, on one or more removable disc drives or in other ways.

The source hub 102 may be located on the same LAN as a media asset management server system 112 associated with a video content provider. This allows data transfer between the media asset management server system 112 and the source hub 102 to benefit from the speed and security of a LAN-based connection, rather than potentially suffer the limited bandwidth and access latency common with Internet data transfers.

In some embodiments, the source hub 102 may comprise a video data analysis module 102a, which performs pre-analysis in relation to source video data. Such analysis may be performed using appropriate software which allows products to be placed digitally into existing video material.

The pre-analysis may be fully automated in that it does not involve any human intervention.

In some embodiments, the video data analysis module 102a is used perform a pre-analysis pass in relation to the source video data to identify one or more segments in the source video data. This may involve using shot detection and/or continuity detection which will now be described in more detail.

Pre-analysis may comprise using a video format detection algorithm to identify the format of the source video data, and if necessary, convert the source video data into a format capable of receiving one or more additional video objects.

Pre-analysis may comprise using a shot detection function to identify the boundaries between different shots in video data. For example, the video data analysis module 102a automatically detects "hard" and "soft" cuts between different shots, which correspond to hard and soft transitions respectively. Hard cuts correspond to an abrupt change in visual similarity between two consecutive frames in the video data. Soft cuts correspond to the beginning or the end of a soft transition (for example wipe and cross fading transitions), which is characterized by a significant but gradual change in visual appearance across several frames.

Pre-analysis may comprise using a continuity detection function to identify similar shots (once detected) in video data. This can be used to maximize the likelihood that each (similar) shot in a given scene is identified—this may be a benefit in the context of digital product placement. For each detected shot, a shot similarity algorithm detects automatically visually similar shots within the source video data. The similarity detection is based on matching between frames, which captures an overall global similarity of background and lighting. It may be used to identify shots which are part of a given scene in order to speed up the process of selecting shots that should be grouped together on the basis that they are similar to each other.

Pre-analysis may comprise using an object and/or locale template recognition function and/or a face detection and recognition function. Object template recognition involves identifying objects which reappear across, for example, multiple episodes of a television program, and which are appropriate for digital product placement, so that they can automatically be found in other episodes of the program. Locale template recognition allows a template to be built for a certain locale in a television program and automatically detect the appearance of the locale in subsequent episodes of the program. A locale is a location (e.g. a room) which appears regularly in the program across multiple episodes. Face detection and recognition involve identifying characters which, for example, reappear across multiple episodes of a television program. This allows for characters to be associated with a particular digital product placement.

Pre-analysis may comprise using a tracking (such as 2D point tracking) function to detect and track multiple point features in video data. This involves using a tracking algorithm to detect and track feature points between consecutive frames. Feature points correspond to locations within an image which are characteristic in visual appearance; in other words they exhibit a strong contrast (such as a dark corner on a bright background). A feature is tracked by finding its location in the next frame by comparing the similarity of its neighboring pixels.

Pre-analysis may comprise using a planar tracking function to follow image regions over time and determine their motion under the assumption that the surface is a plane. This may involve tracking 2D regions defined by splines, calculating their 2D translation, rotation, scale, shear and foreshortening through the video data. This process creates motion information that can be exploited by other video analysis functions.

Pre-analysis may comprise using a motion-from-features detection function which involves using the tracked 2D points to determine 2D motion in the video data. Given a set of tracked feature points, motion-from-features detection involves detecting which points move together according to the same rigid motion.

Pre-analysis may comprise using a 3D tracking function which involves using the tracked 2D points to determine 3D motion in the video data. 3D tracking involves extracting geometric information from a video shot, for example the camera focal distance, position and orientation as it moved. The other information recovered is the 3D shape of the viewed scene, represented as 3D points.

Pre-analysis may comprise using an autokeying function to separate background and foreground areas, allowing products to be digitally placed while respecting any occluding (foreground) objects to provide a natural-looking embedded image. When a foreground object moves in front of the background where it is desired to place a product digitally, the area into which the product is to be placed should stop at the boundary between the foreground and background areas. In general, the digitally placed product should cover the "mask" area of the background data. The correct mask can be especially difficult to create when the edge of the foreground object is very detailed or blurred. The autokey algorithm uses the planar tracker to create motion information so that known background or foreground areas can be propagated forwards and backwards through the video in time.

Pre-analysis may comprise region segmentation which is used to split the video data into regions that span both time and space. Region segmentation involves using an algorithm that detects regions of similar pixels within and across frames of a given video scene, for example to select point features for motion estimation.

Pre-analysis may comprise using a black border detection function, which is used to find the borders around the video image part of video data. This involves using an algorithm that detects the presence of black bars around the frames in a video sequence, which can interfere with various video processing algorithms.

Pre-analysis may comprise proxy creation, which involves creating a lower resolution and/or compressed version of the source video data.

The source hub 102 also may comprise a segment sorting module 102b, which is used to sort the identified segments in the source video data.

As explained above, the video data analysis module 102a may be used to identify the shots in the source video data and to find similar shots once the shots have been identified. The segment sorting module 102b is used to group identified segments together, for example on the basis that they all share one or more common characteristics. The segment sorting module 102b may group identified segments together on the basis that they all correspond to a given scene in the source video data (even if they were dispersed throughout the source video data originally). Other suitable characteristics may include a common object, locale or suchlike.

The source hub 102 also may comprise a digital product placement assessment module 102c, which is used to identify and assess opportunities for digital product placement into the source video data. Identifying and assessing opportunities may involve human interaction. Identifying and assessing may comprise one or more of:

identifying opportunities for digital product placement;
creating a mock-up of some or all of the source video data with one or more digitally placed products;
rendering preview imagery for the opportunity for digital product placement, for example with blue boxes indicating where the product could be digitally placed; and
generating an assessment report.

Hub 104, which is referred to herein as the "creative" hub, is used for creative work in the video processing system 100. The creative hub 104 is provided with appropriate creative software for use in the creative process.

The creative hub 104 may comprise a tracking module 104a, which may be part of the creative software. The tracking module 104a may be used to determine how the position of a digitally placed product should vary when added into video material, for example to take into account any movement of the camera that recorded the video material. Tracking may be automated and/or may involve human intervention.

The creative hub 104 also may comprise a masking module 104b, which may be part of the creative software. The masking module 104b is used to assess how to handle occlusion (if any) of a product to be digitally placed in video material having regard to other objects that may already be present in the video material. Masking assessment may be automated and/or may involve human intervention.

The creative hub 104 also may comprise an appearance modeling module 104c, which may be part of the creative software. The appearance modeling module 104c is used to provide a desired appearance in relation to the digitally placed product, for example using blur, grain, highlight, 3D lighting and other effects. Appearance modeling may be automated and/or may involve human intervention.

Since the creative process uses artistic and image manipulation skills, the creative hub 104 may be located near to a pool of such labor skills. The geographical split between the source hub 102 and the creative hub 104 thus provides an efficiency benefit, whilst still minimizing the risk of piracy by controlling what and how video is transmitted outside of the source hub 102.

Hub 106, which is referred to herein as the "quality control" (QC) hub performs quality control in the video processing system 100. Testing and review of video material or associated data created by the creative hub 104 is performed at the QC hub 106. The QC hub 106 may be geographically located remote from both the source hub 102 and the creative hub 104. The QC hub 106 is provided with appropriate quality control software for use in the quality control process.

The QC hub 106 may comprise a rendering module 106a, which is used to render video material. Rendering may be fully automated.

The QC hub 106 also may comprise a visual QC module 106b, which is used to play back video material for QC purposes and enables a viewer to approve or reject the video material may be viewed from a QC perspective.

Hub 108, which is referred to herein as the "distribution" hub, distributes video content in the video processing system 100. The distribution hub 108 is provided with appropriate software for use in the video distribution process.

The distribution hub 108 may comprise a rendering module 108a, which is similar to the rendering module 106a of the QC hub 106.

The distribution hub 108 may comprise a reconforming module 108b, which is used to combine video material together and will be described in more detail below. Reconforming may be fully automated using the reconforming module 108b.

In some embodiments, the distribution hub 108 is provided in the same geographic location(s) as the source hub 102, and in some instances may comprise at least some of the same hardware. This logical coupling of the source hub 102 and the distribution hub 108 is indicated by a dashed box 114 in FIG. 1. It will be appreciated, however, that the source hub 102 and the distribution hub 108 could be logically separate entities which are not geographically co-located.

The video processing system 100 also includes an online portal 116 which may comprise one or more cloud-based application servers. Data associated with a project may be uploaded to the online portal 116 to facilitate access to the data, for example by clients. The online portal 116 may comprise a portal 116a which provides access to the project data. The project data may comprise, for example, segment selection report data (produced by the segment sorting module 102b), digital product placement assessment report data (produced by the digital product placement assessment module 102c) and a mock-up of video material with a digitally placed product (produced by the digital product placement assessment module 102c).

By providing a set of hubs in this way, different stages of a video processing project can be carried out in a distributed manner across different regions or territories, using high speed Internet connections or other types of connections to communicate relevant data between these regions or territories. The video processing system 100 scales well for the optimal deployment of hardware systems.

The video processing system 100 may include a plurality of source hubs 102, for video data capture and analysis within the video processing system 100. A given source hub 102 may conveniently be located geographically close to a given video data provider or owner. Thus, a source hub 102 could be situated in one geographical area, and another source hub 102 could be located in a different geographical area.

The video processing system 100 may include a plurality of creative hubs 104 for creative functions within the video processing system 100. For example, it may be desired to have a plurality of creative hubs 104, each in different geographical areas.

The video processing system 100 may include a plurality of QC hubs 106 for quality control functions within the video processing system 100. For example, it is possible to have a plurality of QC hubs 106, each in different geographical areas.

The video processing system 100 may include a plurality of distribution hubs 108 for distributing video content within the video processing system 100. A given distribution hub 108 may conveniently be located in a geographical area in which video material will be distributed.

It may also be desirable to have multiple different hubs of the same type (for example multiple creative hubs 104) for different clients, to maintain confidentiality.

Embodiments will now be described in which the video processing system 100 is used for a digital product placement project, wherein one or more additional video objects are added to source video data to produce output video data to which the one or more additional video objects have been added.

In these embodiments, one or more products are digitally placed into a program, such as a television program, intended for broadcast to an audience. The one or more products may serve as advertising components and/or may be used to enhance existing video material for the program, for example to add a special effect.

There are various different types of digital product placement, for example:
  product placement—a branded product or object can be placed into existing video material as if it were there when the video was originally recorded, as would be the case with true product placement; for example, a box of cereal on a kitchen table;
  indoor and outdoor signage—posters, hoardings and billboards, which typically appear in outdoor and indoor scenes and public areas, can be altered to appear to display a chosen product or brand; and
  video placement—video data can be embedded into existing video material, for example a commercial or animated sequence running on a TV screen which is in the background of a scene; it is also possible to insert screens on which the video placement may be played, should one not be available in the scene already.

It will be appreciated, however, that the source video data need not be a program and could correspond to a feature length film, a promotional video, broadcast media, online media or video-on-demand services or other video material to which it is desired to add the one or more additional video objects.

Figure 2:
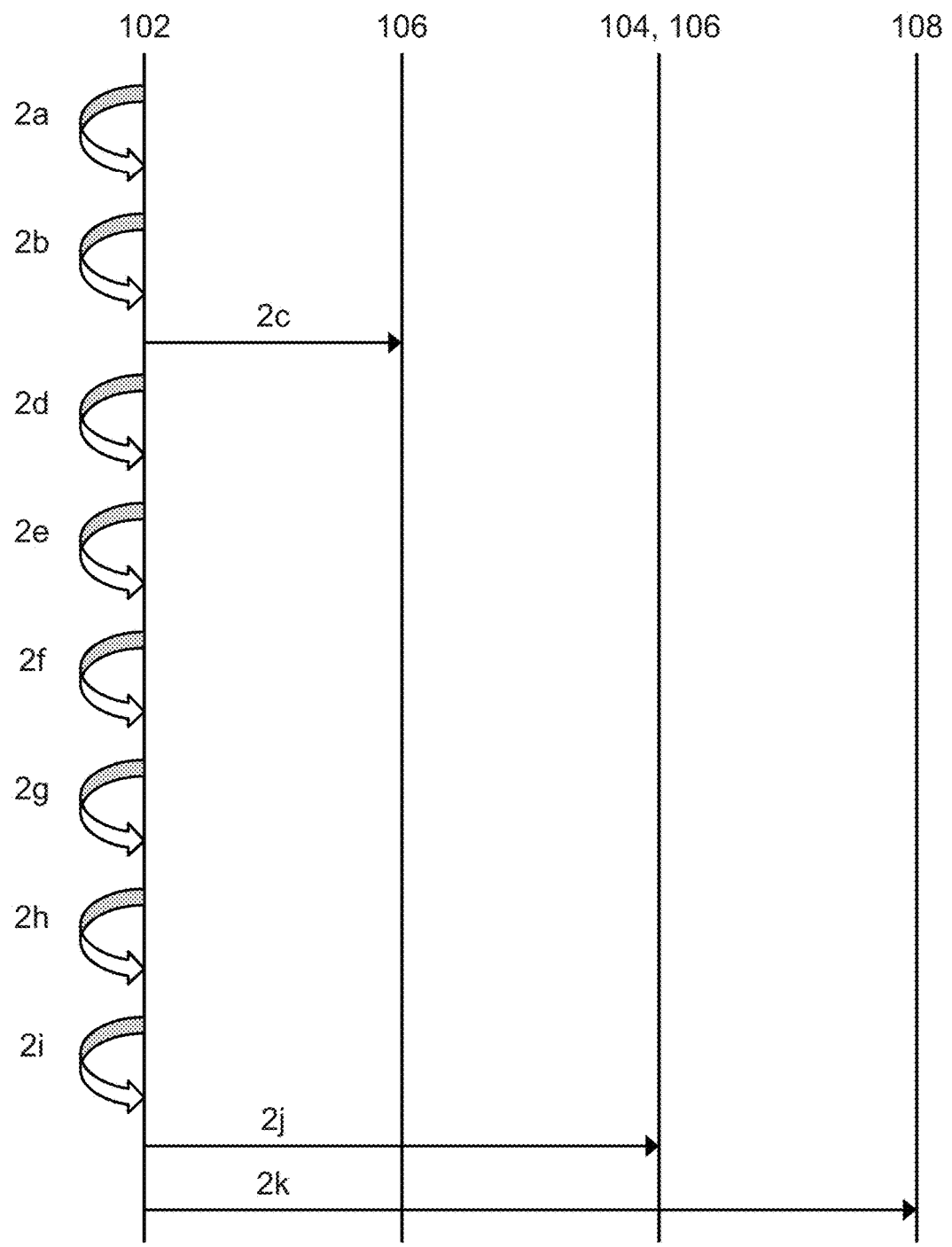
FIG. 2 is a sequence timing diagram showing the flow of messages associated with adding one or more additional video objects into source video data to produce output video data in accordance with some embodiments.

FIG. 2 is a sequence timing diagram showing the flow of messages associated with adding one or more additional video objects into source video data to produce output video data in accordance with some embodiments.

At step 2a, the source hub 102 retrieves source video data. The source video data may be, for example, media program material into which it is desired embed one or more additional video objects, such as one or more virtual products. The video material for the program contains various different shots. The shots are delineated by cuts, where the camera has stopped recording or where the video material is edited to give such an impression. Source video data retrieval may be performed automatically or manually.

At step 2b, the source hub 102 creates a relatively low resolution version of the source video data, referred to herein as a "source proxy".

At step 2c, the source hub 102 synchronizes the source proxy to one or more hubs, such as the creative hub 104 and the QC hub 106. The creative hub 104 and the QC hub 106 can use the source proxy to create in-context creative sequences and quality control sequences during the subsequent stages of video processing. The creation and synchronizing of the source proxy may be performed automatically.

At step 2d, the source hub 102 analyzes the source video data. This may involve conducting a pre-analysis pass in relation to the source video data, for example to identify segments corresponding to separate shots in the source video data. In some embodiments, the step of analyzing the source video data occurs concurrently with or prior to creating the source proxy. Analyzing the source video data may be performed automatically.

At step 2e, the source hub 102 groups one or more of the identified segments together, for example on the basis that they all relate to the same scene or the same locale. The grouping of identified segments is performed automatically during the pre-analysis stage or manually.

At step 2f, the source hub 102 selects one or more of the identified segments for the inclusion of one or more additional video objects. The one or more segments are selected from one or more groupings made in step 2e. The segments may be selected on the basis that they correspond to video material in which it is likely that products could be digitally placed. This step can be performed automatically during the pre-analysis stage or manually.

At step 2g, the source hub 102 creates an embed project; a project for adding one or more additional video objects to one or more segments identified in step 2f. This may involve creating an embed project file which contains data relating to the embed project. The source hub 102 may create multiple embed projects for the source video data. For example, where each embed project relates to a different locale and there are multiple different locales in the source video data. The creation of the embed project may be performed automatically, but with a manual trigger. All automatic processes that are triggered manually may be triggered from a user on any of the hubs with appropriate credentials.

Typically, not all of the identified segments of the source video data are, in fact, suitable for product placement. Thus, not all of the identified segments are selected for digital product placement.

Segment selection may be performed automatically and/or manually. A human operator may be able to assess the appropriateness of opportunities for product placement in context. For example, a jar of instant coffee would suit a kitchen scene, but would look out of place in a bathroom scene, or in an outdoor desert scene—a human operator might therefore not select certain segments that may appear to provide a good opportunity for product placement on the basis that they would not be suitable in context. In another example, it may be decided that a kitchen worktop in a scene provides a good opportunity for a grocery product placement. It may be desirable to determine how long the kitchen worktop is in view—this may be performed manually or automatically. For example, if it is only a fleeting shot, the product placement opportunity is likely to be of limited interest. On the other hand, if the scene in the kitchen is long, and the location chosen for product placement is in view for this duration, it is likely that this scene will be or more interest for a product placement opportunity.

It may also be desirable to determine how many times a particular scene is featured in a program. One element of product placement is temporal consistency, also known as continuity. This involves having the same product in the same position every time that scene occurs in the program.

At step 2h, the source hub 102 combines or concatenates video material associated with the selected segments into one composite video file, one for each embed project. The composite or combined video file is referred to herein as an "embed sequence" or "intermediate working version" of the source video data. The creation of the embed sequence may be performed automatically.

The source hub 102 creates an embed sequence from the selected shots, joining them one after the other into one composite video file. The video material may have been dispersed throughout the source video data so that adjacent video material in the composite scene was not necessarily adjacent in the source video data.

In some embodiments, the embed sequence contains a reduced amount of video material compared to the source video data. For example, the embed sequence may contain video material associated with a subset of the identified segments of the source video data—corresponding to the selected segment(s).

In some embodiments, the embed sequence does not include an audio track component. Some embodiments comprise removing an audio track component from the source video data (if present).

It may be desirable, at this or another stage, to create one or more mock-ups of the desired look of the embed sequence. Such mock-ups may be created using the digital product placement assessment module 102c.

In some embodiments, creating the mock-up(s) may comprise rendering preview imagery which has a blue box or cylinder in the imagery to represent the (as yet unspecified) product to be placed for an interested party to allow the interested party to assess the product placement opportunity in detail. The preview imagery may be at a lower than final resolution, for example to reduce the amount of data to be transmitted if the preview imagery may be communicated over the data communications network 110 and/or so as not to transmit a final resolution version of the preview imagery outside of the source hub 102.

The source hub 102 may insert a 'brand image container' into the preview imagery to assist the assessment by the interested party. For example, CGI-generated street furniture such as an advertising hording or bus shelter could be inserted into the mock-up(s), so that a virtual poster displaying a message from the interested party can be placed on this street furniture. In another example, a CGI-generated television could be inserted into, for example, a living room scene, so that virtual videos could be played on the television set. To promote products, the virtual video could be an advertisement for a product or could merely feature the product in question.

The source hub 102 may also create a report having one or more metrics associated with the potential product placement opportunity, for example specifying how much total time and over how many scenes the potential product can be seen. Much popular television is episodic, which means that same scenes, locales, and characters may reappear in each episode or show in a series. Thus, product placement opportunities may relate to more than one episode of a program, for example for a space on the kitchen table in the house of a famous character over many episodes, or even over multiple series.

There are many ways in which the product placement opportunity can be brought to the attention of the interested party. In some embodiments, the source hub 102 uploads the low resolution mock up material, optionally with the report on the opportunity, to the online portal 116 to facilitate access by the interested party. This allows the opportunity to be presented to a large audience and, using the scalability of cloud-based application servers, can be used to present the opportunity to a number of interested parties in an online marketplace environment. As such, potential advertisers and/or brokers for such advertisers may be able to access continually updated information on current product placement opportunities.

At step 2i, the source hub 102 creates metadata comprising information concerning the embed project.

In some embodiments, the source hub 102 adds the metadata to the embed sequence video data file and/or in the project file created by the source hub 102 at step 2g and/or in a separate file to the embed sequence. The metadata may be created in XML (eXtensible Markup Language) or another format. The creation of the metadata may be performed automatically. The metadata may identify, using one or more data elements for each data type, one or more of the following:

the source hub 102, QC hub 106 and distribution hub 108 to be used for this embed project this information is used to identify the particular hubs involved in this particular embed project where there are multiple source hubs 102, QC hubs 106 and/or distribution hubs 108 in the video processing system 100;

a brand and/or brand agency involved;

the content owner of the media;

the media family (for example the name of a series of which the source video data corresponds to an episode)

the particular episode and season associated with the source video data (where appropriate);

the scene within the episode to which the embed sequence relates—this may be identified using a UUID (Universally Unique IDentifier);

the frames covered by the embed project—this data supports the reconform process, which will be described in more detail below;

the timecodes in the source video data corresponding to frames in the embed sequence—this data also supports the reconform process;

the format of the embed sequence, such as whether it is: progressive video;

interlaced video, upper/lower field dominant;

3:2 pulldown video with specific field dominance and cadence, which may or may not be the same for each shot;

advanced pulldown with specific field dominance and cadence, which may or may not be the same for each shot; and the codec to be used to compress the video when rendering the project—this may be changed subsequently.

At step 2j, the source hub 102 initiates synchronization with the creative hub 104, where the embed project is to be worked on.

In some embodiments, the source hub 102 automatically uploads the embed sequence and/or other project-related data such as project metadata to the creative hub 104, QC hub 106 and/or distribution hub 108 as part of the synchronization. The source hub 102 may also transmit a message to the relevant hub(s) indicating that the new embed project has been created.

By uploading the embed sequence (rather than the entire source video data), the amount of data to be transferred between the source hub 102 and the creative hub 104 may be significantly reduced where the embed sequence contains less video data than the source video data. Since these data transfers may be via limited bandwidth connections, transfer costs and transfer time may also be improved.

The source hub 102 may also pre-emptively upload the embed sequence to the QC hub 106 at this stage, even though the QC work at the QC hub 106 may not be undertaken for some time. Pre-emptively transmitting the embed sequence to the QC hub 106 may reduce processing times when the QC work does eventually start since it can have already received at least some of the embed sequence by the time the QC work starts. In some cases, the QC hub 106 may have received all of the embed sequence by the time the QC work starts at the QC hub 106.

At step 2k, the source hub 102 transmits the source video data to the distribution hub 108 so that the distribution hub 108 has a copy of the source video data into which the one or more additional video objects are to be added. The transmission of the source video data may be performed automatically, but with a manual trigger.

Figure 3:
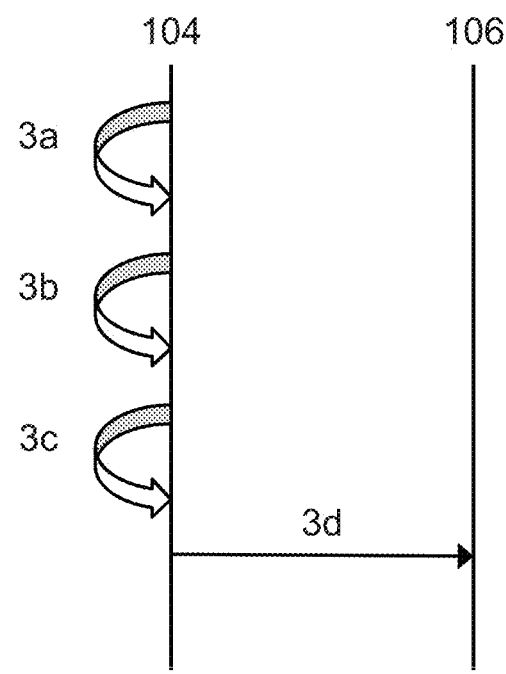
FIG. 3 is a sequence timing diagram showing the flow of messages associated with adding one or more additional video objects into input video data to produce additional video data in accordance with some embodiments.

FIG. 3 is a sequence timing diagram showing the flow of messages associated with adding one or more additional video objects into input video data to produce additional video data in accordance with some embodiments.

In these embodiments, the input video data is the embed sequence transmitted from the source hub 102 to the creative hub 104 at step 2j as part of the synchronization process. In some embodiments, the embed sequence includes only video material corresponding to segments in which the opportunity to embed a product has been agreed. In other words, in such embodiments, segments in which no product is to be added are not communicated to the creative hub 104.

At step 3a, the creative hub 104 sources or prepares additional media data such as high quality artwork to represent the product (referred to herein as "embed artwork"). The embed artwork may comprise artwork images and/or videos and/or other forms of graphics to be used in the embedding process. The embed artwork may include, for example, a high resolution product label, or a suitable photograph of the product or the like. The embed artwork may be prepared at the creative hub 104, received from the source hub 102, from the online portal 116 or otherwise.

There are many ways of building virtual products to which the embed artwork can be applied. For example, virtual products may be built using 3D computer graphics systems such as 3DS Max or Maya, both from Autodesk in Canada. Virtual product building may include the creation of Computer Graphic 3D 'boxes' that may then be wallpapered with product artwork to form a virtual product, or design of a virtual bottle in CGI and then the CGI affixing of label artwork. Sourcing or preparing the additional media data may be performed automatically.

At step 3b, the project is then worked on at the creative hub 104. The creative stage may involve significant human intervention, although at least some of the creative steps may be performed at least in part automatically. For example, when used, the creative software automatically separates its timeline into the various shots in the embed sequence upon reading the embed sequence to facilitate working on each shot in succession.

Various creative tasks that may be performed at the creative hub 104 at this stage will now be described. These tasks may be used to identify one or more desired visual attributes for the digitally placed products to possess when incorporated into the embed sequence. Such visual attributes include, but are not limited to, position attributes, masking attributes, visual appearance attributes (for example relating to blur, grain, highlights, 3D lighting effects).

The creative hub 104 may track motion for the virtual product in the embed sequence and produce corresponding tracking instructions that define the desired motion attributes of the product.

Tracking involves tracking the position of the virtual product, as it will appear in the embedded sequence. In all likelihood, the camera that shot the source video data would have moved, either in a tracking shot, or a zoom, such that the position of the virtual product in the corresponding video material would not be in a constant horizontal and vertical position as referred to in the picture or in 3D space. Tracking is used to determine the horizontal and vertical position of the virtual product on each frame of the embed sequence in which the product is to be placed. In general, the tracking information may include 2D and 3D perspective effects such as scale, rotation and shear.

The creative hub 104 may create masks for any foreground objects in the embed sequence that obscure all or part of the embedding area, i.e. the area in which the virtual product is to be embedded, and produce corresponding masking instructions that define the desired masking attributes in relation to product.

In some embodiments, this process may comprise using automatic and semi-automatic techniques such as rotoscoping and keying, in which a combination of user adjustable settings and algorithms may be used to separate the foreground and the background in the embed sequence. Rotoscoping involves, in effect, hand-drawing the outline of occluding objects in front of the virtual product, such as actors and furniture, over the live action. Keying involves using a key signal to determine which of two images is to be chosen for that part of the final image.

The creative hub 104 may perform appearance modeling, relating to positioning and adjusting the appearance of the embed artwork, and produce corresponding appearance modeling instructions that define the desired visual appearance of the product.

For example, it may be desirable to integrate the virtual product into the embed sequence so that it looks like it might have been present when the corresponding video was originally shot. Appearance modeling may therefore be used to be to make the virtual product look real. It may involve perspective alteration of the object to be placed, to make it look natural in the scene. It may additionally or alternatively involve adding 3D lighting, for example where a directional light is near the virtual object a viewer would expect the virtual object to cast shadows from the light. 3D lighting can be added in a number of industry standard 3D packages such as 3DS-Max or Maya from Autodesk Inc, in Canada.

In some cases, it may be desirable to apply one or more further image processing features to the CGI object that is to be placed in the scene, so that the object matches the look created by the camera, lighting and post production process.

Alternatively, an entirely animated and/or artificial appearance may be desired.

One option for rendering the final material—a final version of the source video material which includes any embedded products—would be to render it at the creative hub 104. This would involve rendering the embed sequence at the creative hub 104, combining it in with the source video data at the creative hub 104 to form a complete program with embedding in, and then transferring the complete embedded material to the distribution hub 108, possibly via the QC hub 106. However, all of the source video data would need to be available at the creative hub 104 in order to do so. As explained above, in some embodiments, only the embed sequence, rather than the complete source video data, is transmitted to the creative hub 104.

Various embodiments which will now be described in which the final material to be broadcast is not finally rendered at the creative 104. These embodiments relate to a technique referred to herein as "push render" where the creative hub 104 transmits instructions to another hub to render the project. The rendered material can then be combined in with the relevant video data at another hub.

Transmitting the instructions, rather than the rendered material, can result in a significant reduction in the amount of data transmitted between the different hubs. Notwithstanding this, it may be desirable, in some circumstances, to transmit rendered material in addition to, or as an alternative to, push rendering instructions—push rendering does not necessarily preclude transmitting rendered material, but provides an additional option for reducing data transfers when used.

Embed projects may be managed using a suitable project management system. The project management system can include management of project initiation, creation of the embed artwork, tracking, masking and appearance modeling, approvals and other functions. The project management system may also support various different push render phases indicating whether the embed project push render is:

- a local render, in which an embed project output video (produced by rendering the instructions in a push render) is rendered locally on a hub but has no additional workflow links such as online video creation or project management notifications;
- a blue box render in which the project has blue boxes placed in the video material to identify the areas where the actual products would or could be digitally placed;
- a QC render to check for the quality of the tracking, masking, appearance modeling and other work carried out at the creative hub 104;
- a final QC render to check the appearance of the final embed before delivering the completed project to the client(s); and
- a delivery render, in which the rendered video is sent to the client to view online so the client can check the complete placement with audio—when approved, the final media can be delivered back to the client.

At step 3c, the creative hub 104 may: a) create a project file which contains all of the tracking, masking, appearance modeling instructions and any other data created at the creative hub 104, as well as, optionally, the embed project metadata or a subset thereof; or b) update an existing project file received from the source hub 102 with such data. Creating or updating the project file may be performed automatically, but with a manual trigger.

In some embodiments, the creative hub 104 receives the metadata created at the source hub 102 in the embed sequence video file or in a separate file. The creative hub 104 may include some or all of the metadata in the project file to support the push render workflow. For example, where the metadata identified the distribution hub 108 to be used in this project, the project file may comprise data identifying the distribution hub 108. In addition, where the metadata identified one or more frames in the source video data that corresponded to the embed sequence, the project file may include such data to facilitate reconforming.

At step 3d, the creative hub 104 then transmits or pushes video file data comprising at least the rendering instructions to the QC hub 106 for QC purposes.

The video file data sent to the QC hub 106 to initiate push rendering of the project at the QC hub 106 for QC purposes may be a package (for example a zip package) including (1) a project file defining the tracking, masking, appearance modeling, embed artwork, and other data (such as effects data); (2) the embed artwork; and (3) some or all of the embed project metadata.

Alternatively, video file data could comprise only items (1) and (3). The embed artwork could be synced to the QC hub 106 automatically as soon as it is created on the file system. For example, the creative hub 104 could transmit the embed artwork to the source hub 102 and doing so could trigger uploading of the embed artwork to the QC hub 106 associated with the project. This may reduce further the amount of data to be sent to the QC hub 106 when the push render is initiated in that the QC hub 106 may receive at least some of the embed artwork prior to starting the QC work. Transmitting the video file data to the QC hub may be performed automatically, but with a manual trigger.

Figure 4:
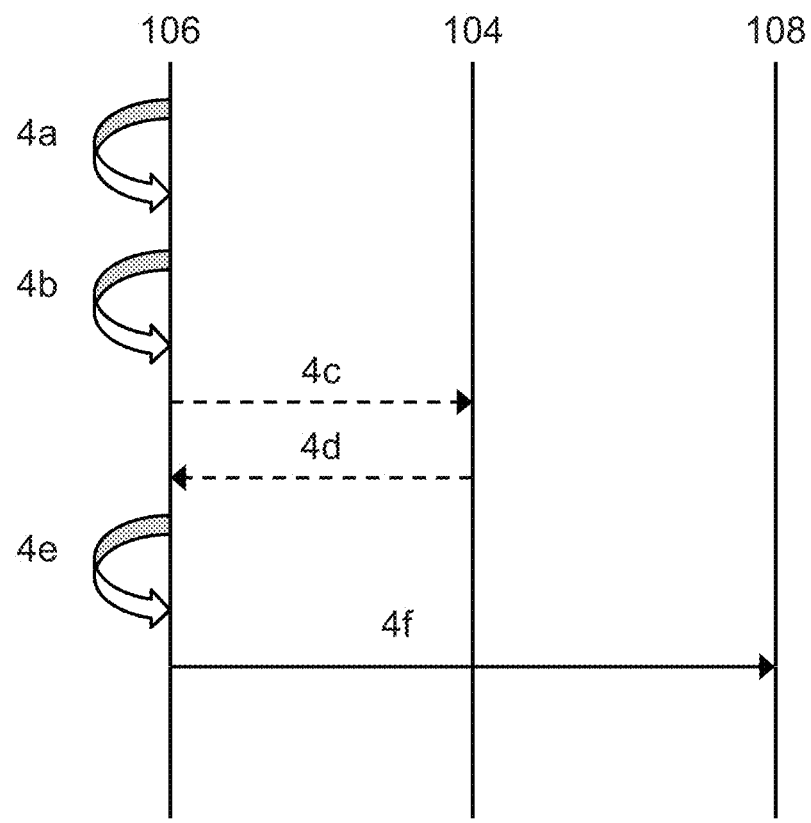
FIG. 4 is a sequence timing diagram showing the flow of messages associated with adding one or more additional video objects into input video data to produce additional video data in accordance with some embodiments.

FIG. 4 is a sequence timing diagram showing the flow of messages associated with adding one or more additional video objects into input video data to produce additional video data in accordance with some embodiments. The QC hub 106 has received the video file data transmitted from the creative hub 104 at step 3d.

At step 4a, the QC hub 106 renders the project based on the received rendering instructions. Rendering produces additional video data that contains the rendered embed artwork. Each frame of the additional video data contains the rendered embed artwork in the correct place and with the correct look as produced at the creative hub 104 and as defined in the project file. Rendering the project based on the received rendering instructions may be performed automatically.

In some embodiments, the rendering technique used is precomposite rendering, wherein only the embed artwork is rendered, with a separate alpha channel, so that it can be later composited onto (i.e. blended with) the source video data. This technique allows there to be only one stage of reading and writing original media frames; the final stage of reconform which will be described in more detail below. This reduces generation loss caused by decoding and re-encoding the video data. It also allows the rendered embed project video to be small.

In more detail, for a computer-generated 2D image element which stores a color for each pixel, additional data is stored in a separate alpha channel with a value between 0 and 1. A stored value of 0 indicates that no objects in the 2D image overlapped the associated pixel and therefore that the pixel would effectively be transparent if the 2D image were blended with another image. On the other hand, a value of 1 indicates that an object in the 2D image overlapped the pixel and therefore that the pixel would be opaque if the 2D image were blended with another image.

Thus in some embodiments, rendering results in, in effect, additional video data in the form of overlay video data in which the virtual products are rendered and any embed artwork is applied to them. The overlay video data may be viewed as part of the QC process to check the quality of the creative work performed at the creative hub 104.

Various steps may or may not be performed at the QC hub 106 depending on the push render options used and which push rendering phase has been reached.

The QC hub 106 may compute metrics of the embedded sequence, for example by measuring the area and location of the embed(s) (embedded object(s)) in each frame. These metrics may be combined with integration metrics (human judgments as to how well the embed interacts with the scene in which it is placed) into a report which can be delivered to an interested party. For instance, the embed may be in the background or the foreground, and there may or may not be actual or implied interaction between the embed and (key) actors. In embodiments, the report is published online via the online portal 116 and made available to designated parties.

In some embodiments, the overlay video data may be combined (i.e. blended) with video data derived from the source video data, such as the embed sequence or a proxy version of the source video data.

Push rendering an embed project file may create some or all of the following output files, using appropriate identifiers to identify the content provider, media family, episode etc.

The QC hub 106 may produce a composite of the rendered embed artwork and the embed sequence for viewing for QC purposes. In other words, the QC hub 106 may create a sequence comprising the embed sequence with the embed artwork applied. This sequence can be used to judge the quality of the embedded artwork, in each shot in isolation.

The QC hub 106 may create a sequence comprising a contiguous section of the source video data (extracted from the source proxy), with the shots from the embed sequence showing the embedded artwork that was added to those shots. Any audio in the source video data that had been removed could be added back into the scene previews at this stage. This version is used to judge the quality of embedded artwork in the context of the surrounding video and the audio.

In terms of the rendering process, the QC hub 106 may create a video data file, for example a ".mov" file, in an appropriate directory. This is the output precomposite (RGB plus alpha channel) video containing the rendered virtual product with embed artwork applied thereto. The frame numbers for this video data file correspond to those of the embed sequence.

The QC hub 106 may create a file (such as an XML file) which includes per-frame metrics and a digital image file metrics (such as a .jpg file) which is a representative metrics image of the embedded sequence with a blue border.

The QC hub 106 may also create a file that specifies the relevant push render phase (in this case, the QC phase). This is a copy of the project file or other video file data (such as the zip package) that was rendered.

The QC hub 106 may also create one or more branded previews (for example in MP4 format) that may be sent to the online portal 116 for preview by the client(s).

The QC hub 106 may also create a video data file, such as a ".mov" file, for the output composite (RGB) video containing the virtual product(s) rendered into the embed sequence. This process may involve digital compositing in which multiple digital images are combined to make a final image; the images being combined being frames in the precomposite video and corresponding frames in the embed sequence. This may comprise alpha blending, where the contribution of a given pixel in the precomposite video to a corresponding pixel in the composited video is based on the opacity value stored in the alpha channel in association with the pixel. Where the opacity value of a foreground pixel is 0 (i.e. where the stored value associated with that value is 0), the corresponding pixel is completely transparent in the foreground; where the opacity value of a foreground pixel is 1, (i.e. where the stored value associated with that value is 1), the corresponding pixel is completely opaque in the foreground.

At step 4b, an operator uses the visual QC module 106b at the QC hub 106 to perform a visual QC check on the sequences that have been processed at the QC hub 106. This may involve trained operators viewing the rendered material and looking for errors. If visual faults are detected, they can be communicated back to the creative hub 104, where they can be corrected (steps 4c and 4d). The cycles of correction may be recorded in the project file. The QC check is principally performed manually, although some aspects may be automated.

At step 4f, when the material has finally passed quality control (step 4e), the QC hub 106 transmits video file data to the distribution hub 108. The video file data may comprise a push render (which enables the distribution hub 108 to generate associated video material, rather than transmitting the video material itself), or video material that has already been rendered or otherwise produced.

Similar to the video file data transmitted to the QC hub 106 by the creative hub 104 at step 3d to initiate push rendering at the QC hub 106, the video file data sent to the distribution hub 108 at step 4f may be a zip package including items (1) to (3) specified above or may be a single file containing items (1) and (3) of the zip package. The embed artwork could likewise have been synced to the distribution hub 108 automatically as soon as it was created on the file system to reduce further the amount of data to be sent to the distribution hub 108 when the push render is initiated.

It will be appreciated that the video file data transmitted to the distribution hub at step 4f may comprise different data to that in the video file data transmitted by the creative hub 104 at step 3d. For example, as part of the QC process, the creative hub 104 may have updated at least some of the data in the video file data and communicated at least some of the updated data to the QC hub 106 at step 4d. The QC hub 106 could then transmit video file data including the updated data to the distribution hub 108 at step 4f. Alternatively or additionally, the QC hub 106 may update some or all of the data in the video file data transmitted by the creative hub 104 at step 4d itself and include the updated data in the video file data transmitted to the distribution hub 108 at step 4f. The transmission of the video file data to the distribution hub 108 may be performed automatically, but with a manual input.

Figure 5:
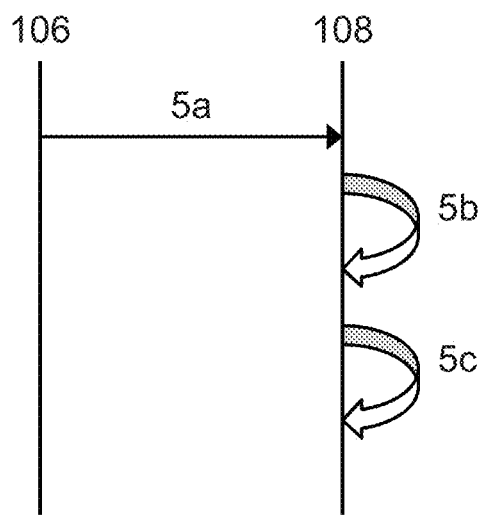
FIG. 5 is a sequence timing diagram showing the flow of messages associated with adding one or more additional video objects into source video data to produce output video data in accordance with some embodiments.

FIG. 5 is a sequence timing diagram showing the flow of messages associated with adding one or more additional video objects into source video data to produce output video data in accordance with some embodiments.

At step 5a, the distribution hub 108 receives the video file data from the QC hub 106.

In some embodiments, the distribution hub 108 has also already received the source video data, or data derived therefrom, transmitted by the source hub at step 2k.

At step 5b, the distribution hub 108 obtains video material comprising the one or more additional video objects based on the video file data. This may involve rendering the video material if the video file data includes instructions for generating the video material. Rendering may be similar to or the same as the rendering carried out at the QC hub 106 and the distribution hub 108 may create at least some of the same data files as those created at the QC hub 108 during the QC push render phase, albeit at a final QC render and/or delivery render phase.

Alternatively, the video file data may already contain the video material, in which case the distribution hub 108 may extract the video material from the video file data. Rendering may be performed automatically.

At step 5c, the distribution hub 108 combines the rendered video material (which includes the embedded object(s)) with the source video data to form a completed program, or output video data, which contains the digitally placed product(s). Reconform is performed automatically and may be initiated from within an appropriate software application or by an online user with appropriate credentials. The output video data is then suitable for broadcasting or other dissemination, such as the sale of DVDs, or downloading programs via the Internet.

In more detail, reconform takes the result of push rendering one or more embed project files as described above. The precomposite (overlay) video data produced by the push render is blended with or composited onto the source video data, using the metadata associated with the embed project to place the rendered product(s) in the correct frames in the source video data. Within the frame range, each frame is read from source video data, and any precomposite outputs for that frame provided by the push rendered projects are overlaid on the source video data, in an internal memory buffer. Finally the frame is exported. To determine which embed to overlay, the reconform software looks at the metadata for the push render project. The relevant data is that which specifies, for each shot from the embed project, the start frame of the shot in the timeline of the embed sequence, the start frame of the shot in the timeline of the source video data, and the number of frames in the shot. From this information, each frame may be mapped between the source video data and the precomposite video. The relevant frames in the source video data may, however, be identified in the metadata in another manner.

In some embodiments, reconform may be performed by a cluster of servers or other suitable computing devices. The reconform then commences on the cluster.

A new version of the source video data is thereby created which includes the modified frames to produce the final video material or output video data.

In the embodiments described above, the amount of user interaction involved in push rendering a project is minimal. One or more operators specify which embed project file to render, and the phase of the push render workflow (for example, the QC stage or the final delivery stage). All details of the render itself are, in effect, automatically performed based on rendering instructions in the project file or other push render data.

In some embodiments, other parts of the metadata associated with the project are used in the process of rendering the project. For example, online videos may be created and automatically assigned permissions that allow only the correct client(s), whose details are included in the metadata, to view them.

In some embodiments, the project file may comprise data specifying one or more locations on the file system to which the project is to be rendered. In such embodiments, the workflow may be simplified because the push render is simultaneously a rendering solution and a distribution solution. This allows the process of supporting the workflow to be achieved in one step.

In some cases, there may be information that will be part of the report on the project, but which is sensitive to the client and which it would therefore be preferred not to send to the creative hub 104 or the QC hub 106. By rendering the project at the source hub 102 or distribution hub 108, such secret information need not be sent to the creative hub 104 or the QC hub 106. Nevertheless, if it is desired to render at the creative hub 104 or the QC hub 106, the secret information could be automatically omitted from any report created by the render, or the report itself omitted.

Some embodiments provide a feedback mechanism in relation to the push render workflow, because the project may be pushed from the creative hub 104 or QC hub 106 to another hub, such as the source hub 102 or the distribution hub 108, which may be on the other side of the world. Such embodiments provide feedback on the progress and success or failure of the rendering by feeding back the status of the render to software running at the creative hub 104 and/or QC hub 106.

In some embodiments, a project may be push rendered to a hub other than the one specified as the QC hub 106 or distribution hub 108. For example, it may be desired to render an embed project generated by the creative hub 104 at a hub other than hubs 102, 106, 106, 108. The other hub may have a proxy version (low resolution and compressed) of relevant parts of the source video data. From this, it would be possible to render an embed project through local push rendering. This could be used as part of a QC process, viewing the result of the rendering to ensure that the project has been completed satisfactorily.

As explained above, the video processing system 100 may comprise a plurality of different source hubs 102, creative hubs 104, QC hubs 106 and/or distribution hubs 108. Where a single piece of source material gives rise to different embed projects targeted at different countries, it may be desirable to transmit the source video data in advance to respective distribution hubs 108 in those countries and then render the projects at those distribution hubs 108. An example may be an episode of a popular US episodic series shown in Europe. In Poland, it may be required to incorporate a Polish brand, but in Germany, in the same scenes, it may be required to position a German brand. In this example, the source hub 102 transmits the source video data to distribution hubs 108 in Poland and Germany and transmits embed sequences to both the Polish and German creative hubs 104. This may significantly reduce the time between obtaining client approval and final delivery at the correct system for broadcast or distribution.

Embodiments described above provide significant data transfer savings, in that the creative hub 104 and/or the QC hub 106 only transmits instructions on what to do to embed and then render the additional video data, rather than transmitting the rendered embed sequence itself with the embedded objects. Such embodiments do not preclude transfer of some, or all, of the rendered embed sequence.

Where the embed instructions are sent from the creative hub 104 to the source hub 102, QC hub 106 or distribution hub 108, these instructions may be interpreted locally by similar software as was used at the creative hub 104.

Figure 6:
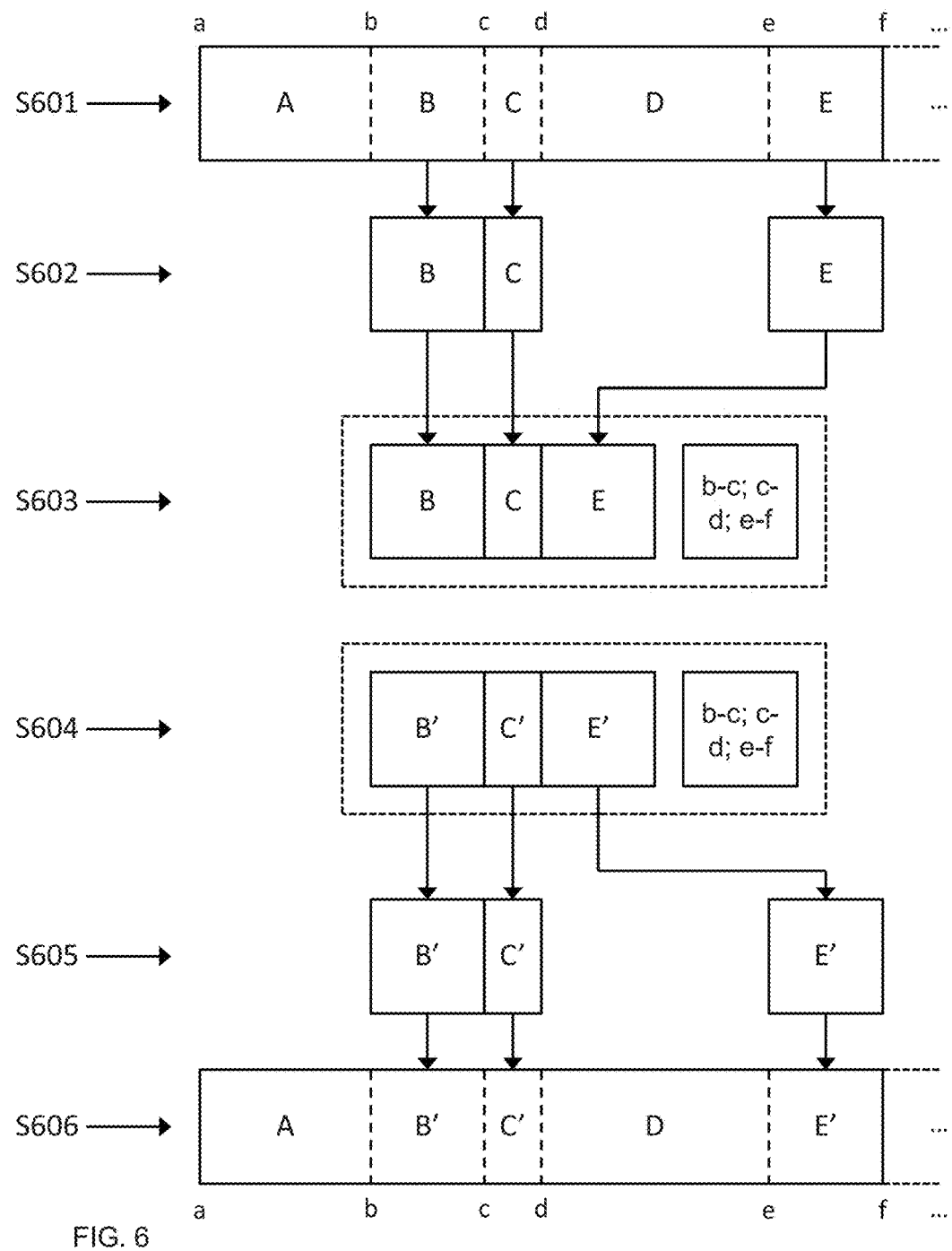
FIG. 6 is a diagram that illustrates schematically a method for incorporating one or more additional video objects into source video data to produce output video data in accordance with some embodiments.

FIG. 6 is a diagram that illustrates schematically a method for incorporating one or more additional video objects into source video data to produce output video data in accordance with some embodiments.

At step S601, source video data is retrieved. The source video data is made up of a number of frames of image data. Segments (A, B, C, D, E, . . . ) of the source video data identified. For example, each segment may correspond to a shot in the source video data. Each segment may comprise a number of frames of video material. For example, segment A may comprise a number of frames of video material between frame identifiers "a" and "b", segment B may comprise a number of frames of video material between frame identifiers "b" and "c" and so on. The frame references may be, for example, frame numbers or timecodes associated with the start and end frames of each segment.

At step S602, one or more of the identified segments within the source video data are selected for the inclusion of one or more additional video objects. For example, segments B, C and E may be selected for the inclusion of the one or more additional video objects.

At step S603 an intermediate working version of the source video data is created. The intermediate working version includes at least video material corresponding to the selected segments (segments B, C and E). Metadata which identifies at least one frame within the source video data which corresponds to the selected segments is created. The metadata identifies the frames in the source video data to which segments B, C and E correspond by including the frame identifiers that correspond to the start and end of each segment: b-c; c-d; and e-f respectively.

At least the intermediate working version is transmitted to a remote system for the creation of additional video data for including the one or more additional video objects in the output video data. In some cases, the metadata may also be transmitted to the remote system.

At step S604, the video file data associated with the additional video data is received after it has been created using the intermediate working version transmitted to the remote system. In some embodiments, the additional video data is the intermediate working version with the one or more additional video objects added thereto. Segments B, C and E in the intermediate working version are denoted as segments B', C' and E' in the additional video data to indicate that the one or more additional video objects have been added thereto. Metadata is retrieved which identifies at least one frame within the source video data to which the additional video data is to be added. As depicted in FIG. 6, the retrieved metadata includes the frame identifiers that correspond to the start and end of each segment B', C' and E' in the additional video data: b-c; c-d; and e-f respectively.

At step S605, the metadata can be used to determine the frames within the source video data to which the additional video data is to be added.

At step S606, at least the additional video data, the source video data and the retrieved metadata are used to produce the output video data. In particular, the output video data includes the original segments A and D that did not form part of the intermediate working version. The segments B', C' and E' in the additional video data to which the one or more additional video objects have been added into the source video data and have replaced corresponding original segments B, C and E.

Figure 7:
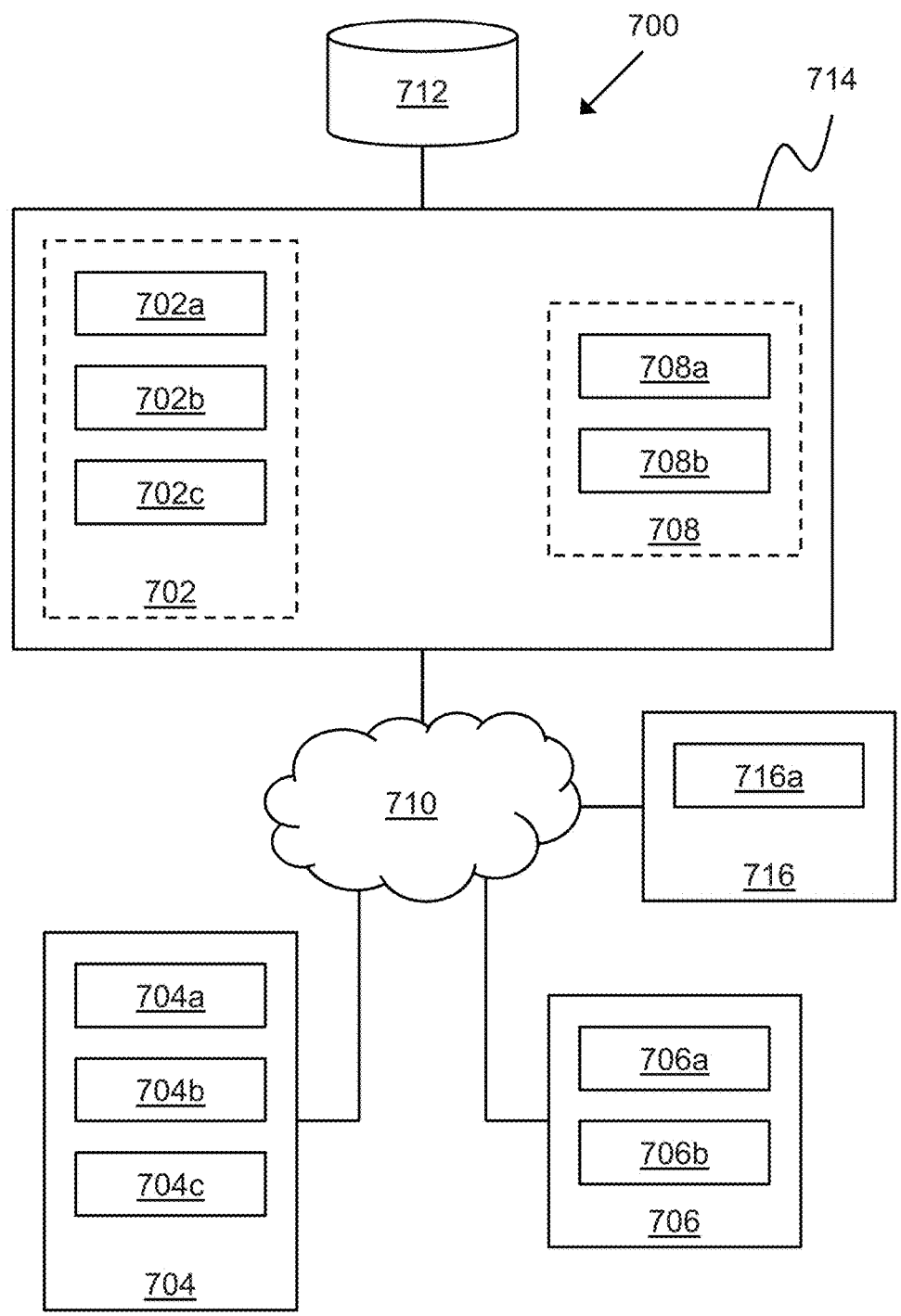
FIG. 7 is a schematic diagram showing a system in accordance with some embodiments.

FIG. 7 is a schematic diagram showing a video processing system 700 in accordance with some embodiments.

The video processing system 700 is similar to the video processing system 100 described above in relation to, and as depicted in, FIG. 1. Like features are indicated using the same reference numerals, incremented by 600, and a detailed description of such features are omitted here.

In the video processing system 700, the functionality of the source hub 702 and the distribution hub 708 are combined into a single entity 714. Entity 714 thus includes at least the video data analysis module 702a, segment sorting module 702b, digital product placement assessment module 702c, rendering module 708a and reconforming module 708b.

Figure 8:
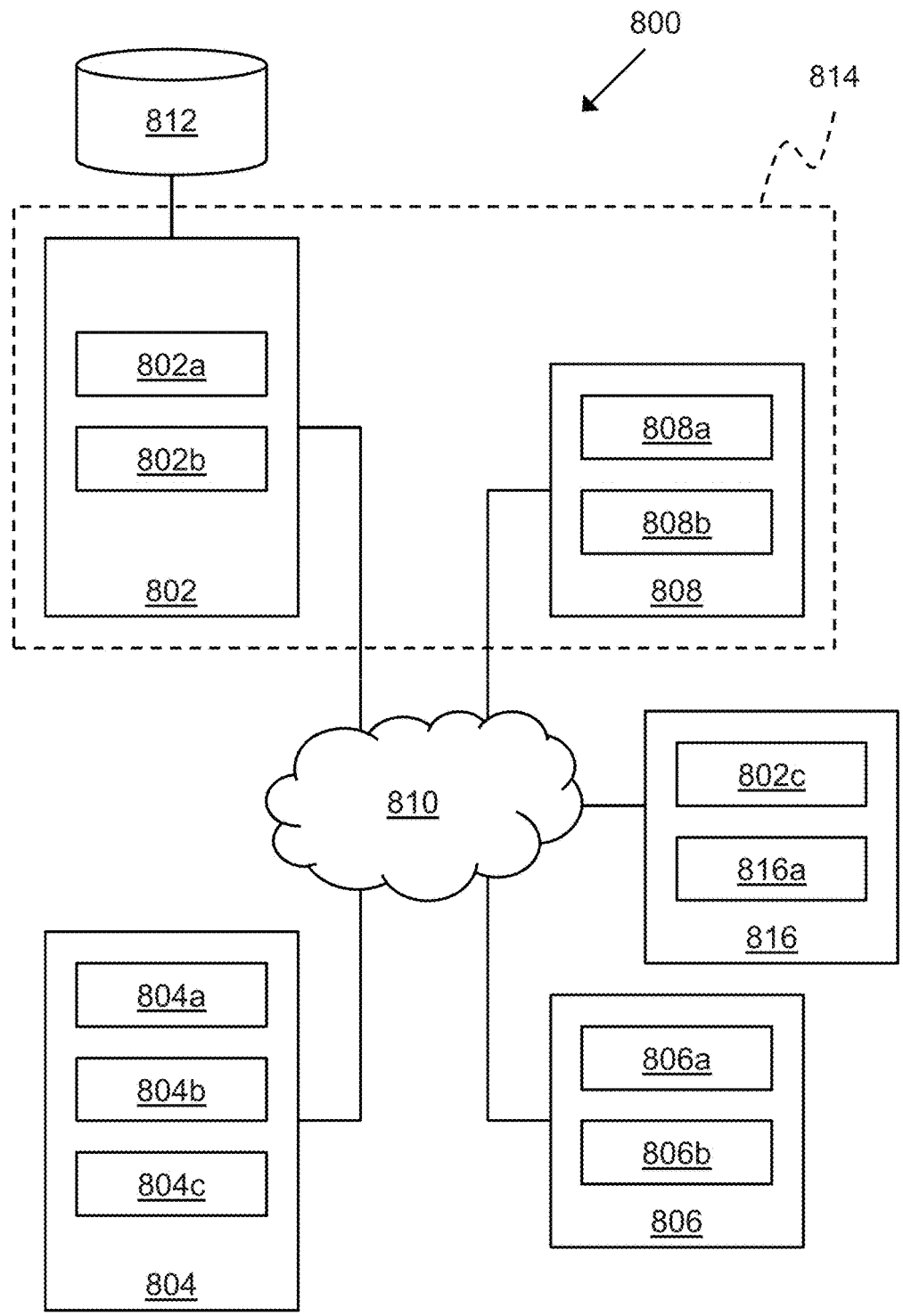
FIG. 8 is a schematic diagram showing a system in accordance with some embodiments.

FIG. 8 is a schematic diagram showing a video processing system 800 in accordance with some embodiments.

The video processing system 800 is similar to the video processing system 100 described above in relation to, and as depicted in, FIG. 1. Like features are indicated using the same reference numerals, incremented by 700, and a detailed description of such features are omitted here.

In the video processing system 800, the digital product placement assessment module 102c of the source hub 102 is moved into the online portal 816; the online portal 816 therefore includes a digital product placement assessment module 802c which performs the same or similar functions as the digital product placement assessment module 102c of the source hub 102. In such embodiments, the embed sequence may be created and be placed in the cloud, for example at low resolution, which could be used to produce mock-ups of the product placement opportunity locally at customer premises.

Although, in the video processing system 800 depicted in FIG. 8, only the digital product placement assessment module 102c of the source hub 102 is moved into the online portal 816, embodiments are envisaged in which one or more of the video data analysis module 102a, segment sorting module 102b, and the digital product placement assessment module 102c of the source hub 102 are moved into the online portal 816. For example, the segment sorting module 102b could be placed into the online portal 816, allowing characters and locales to be annotated at customer premises.

In some embodiments, all segments in the source video data may be placed into the online portal 816. This may not be as secure as uploading only some, selected segments. However, the form of the video material, after pre-analysis/segment sorting, may not be in the same linear timeline as the source video data. This is because pre-analysis/segment sorting may group like scenes, camera angles and/or locales that may appear at different parts of the program together. Thus, even if a determined third party were to get hold of the video material, they would have to undo the pre-analysis/segment sorting, and edit the video material back together into its original form. This offers some form of security.

Figure 9:
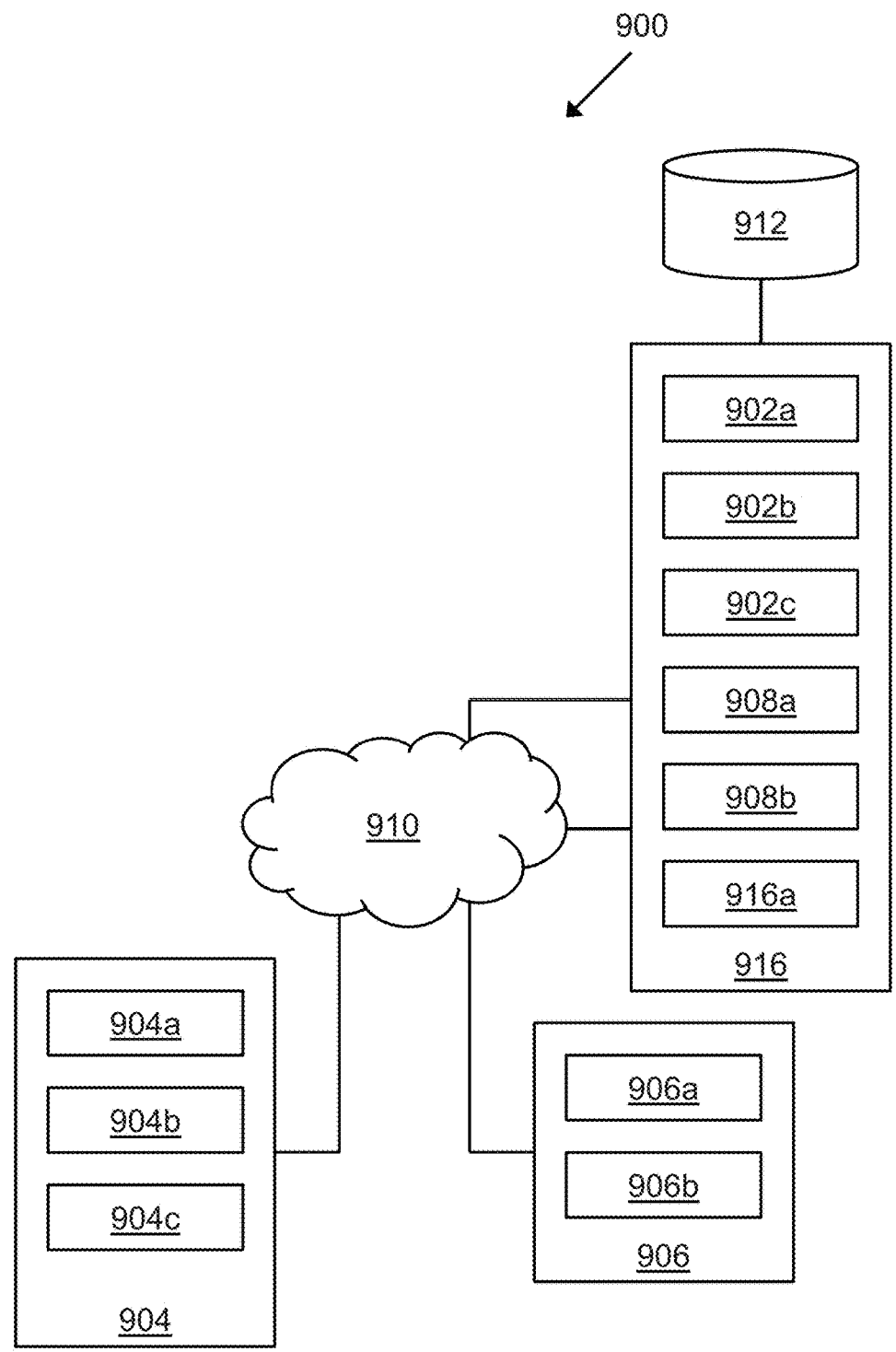
FIG. 9 is a schematic diagram showing a system in accordance with some embodiments.

FIG. 9 is a schematic diagram showing a video processing system 900 in accordance with some embodiments.

The video processing system 900 is similar to the video processing system 100 described above in relation to, and as depicted in, FIG. 1. Like features are indicated using the same reference numerals, incremented by 800, and a detailed description of such features are omitted here.

In the video processing system 900, all of the processing performed at or by the source hub 102 and the distribution hub 108 has been pushed into the online portal 916. The video processing system 900 allows pre-analysis, segment sorting, assessment, output rendering and reconforming all to be carried out in or from the online portal 916. In such embodiments, cloud security should be carefully considered and increased where possible, as both the source video data and the output video data would be contained within the online portal 916, either of which may be desired by unauthorized third parties.

Figure 10:
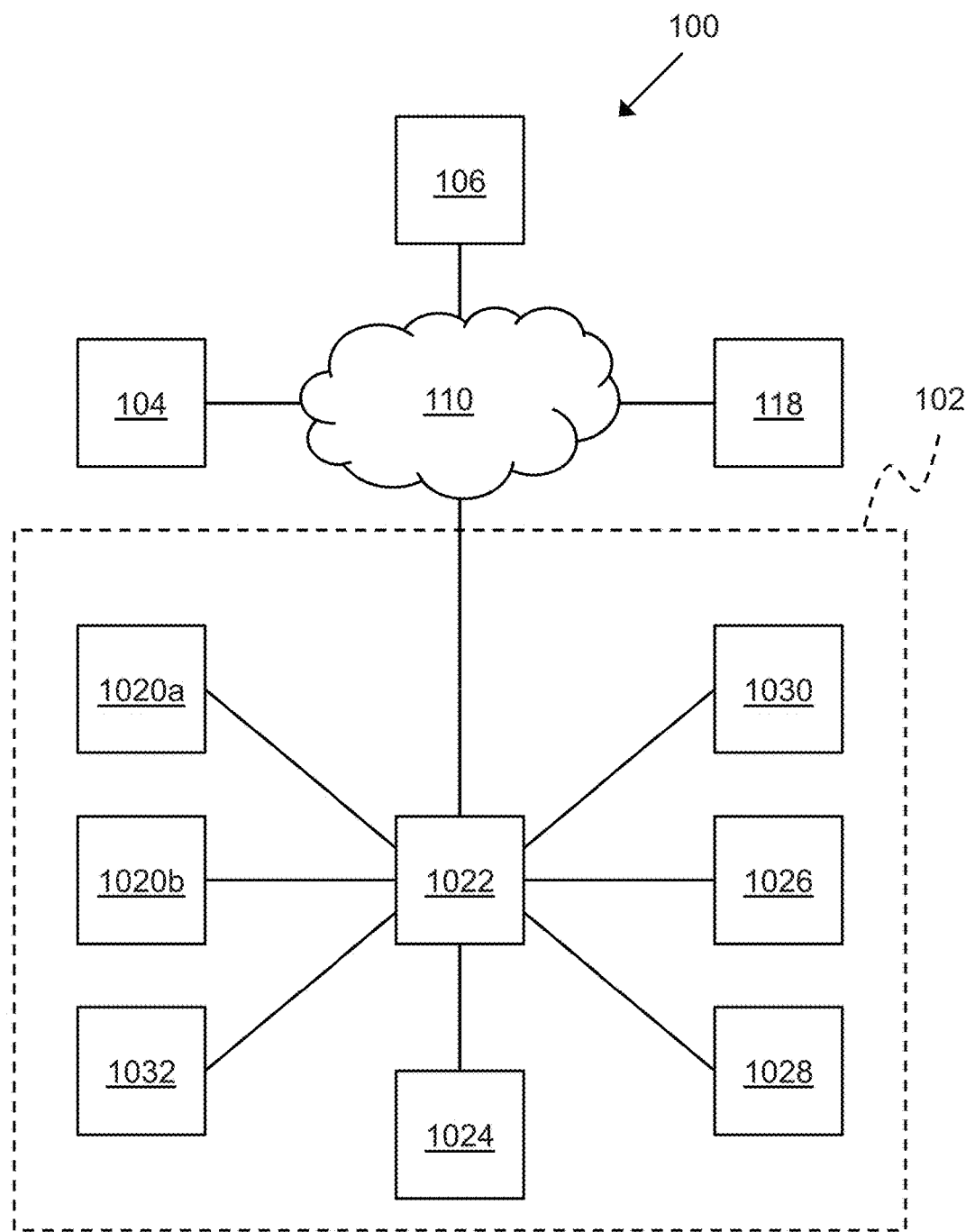
FIG. 10 is a schematic diagram showing a system in accordance with some embodiments.

FIG. 10 is a schematic diagram showing a system in accordance with some embodiments. In particular, FIG. 10 illustrates schematically various components of the source hub 102.

In some embodiments, the components of the source hub 102 are all located on a suitable subnet, on the same LAN. In some embodiments, the source hub connects to other hubs 104, 106, 108 in the video processing system 100 via a VPN.

The source hub 102 may comprise a plurality of workstations 1020a, 1020b. The workstations 1020a, 1020b are connected to a network switch 1022 via suitable connections, for example via 1 Gb Ethernet connections.

The source hub 102 includes a cluster 1024 of high speed parallel processing graphics processing unit (GPU)-enabled computers for real-time video processing which are also connected to the switch 222 via suitable connections, for example via 1 Gb Ethernet connections.

The source hub 102 includes primary and backup storage systems 1026, 1028. The storage systems 1026, 1028 store media and other data associated with projects that are processed in the video processing system 100. The data storage systems 1026, 1028 may store ingested source video data, output video data and other data such as metadata files (for example in XML format), video proxies, reports and assets used in processing video data. The data storage systems 1026, 1028 serve both the workstations 1020a, 1020b and the cluster 1024 and are connected to the switch 1022 via suitable connections, such as 10 Gb Ethernet connections.

The source hub 102 includes a File Transfer Protocol (FTP) server 1030 for transferring files such as media files and associated files, which is also connected to the switch 1022 via a suitable connection, for example a 1 Gb Ethernet connection.

The source hub 102 may include a media capture device 1032, such as a video tape recorder (VTR) 1032 for importing and exporting video material. The media capture device 1032 is connected to the switch 1022 via a suitable connection.

The switch 1022 is connected to the data communications network 110 via a suitable connection which may include a VPN firewall to allow tunneling into the hub.

The above embodiments are to be understood as illustrative examples. Further embodiments of the invention are envisioned.

Embodiments have been described in which the creative hub 104 receives the embed sequence from the source hub 102 and creates push render instructions for the project associated with the embed sequence. However, embodiments are envisaged in which the input video data retrieved by the creative hub 104 is not the intermediate version and, indeed, embodiments relating to push render are not limited to receiving video data from a source hub 102. In some embodiments, the input video data could be retrieved from an entity outside the video processing system 100, 700, 800, 900 and the input video data may not have been subject to the analysis, segment sorting and assessment described above.

Embodiments have been described above in which the creative hub 104 includes various creative modules 104a, 104b, 104c which are used to analyze input video data and to generate instructions for generating additional video data comprising the one or more additional video objects. In some embodiments, the source hub 102 may also comprise some or all such modules. The source hub 102 may use such modules to create preview imagery that may be a closer resemblance to final result.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of embedding one or more additional video objects into at least one frame of source video data to produce output video data, the method comprising:
   retrieving the source video data;
   identifying one or more segments of the source video data;
   identifying at least one similar segment within the source video data, the similar segment comprising a segment within the source video data that is similar to at least one of the identified one or more segments;
   creating a grouping of segments that includes the at least one of the identified one or more segments and the corresponding at least one similar segment;
   selecting one or more of the segments within the grouping of segments for embedding one or more additional video objects into one or more individual frames of the source video data;
   creating an intermediate working version of the source video data, the intermediate working version including at least video material corresponding to the selected one or more segments, wherein the intermediate working version contains a reduced amount of video material compared to the source video data;
   creating metadata which identifies at least one frame within the source video data which corresponds to the selected one or more segments;
   transmitting at least the intermediate working version to a remote system for creation of additional video data including the one or more additional video objects to be embedded in the output video data;
   receiving video file data associated with the additional video data after the additional video data has been created using the intermediate working version transmitted to the remote system;
   obtaining the additional video data based on the video file data;
   retrieving metadata which identifies at least one frame within the source video data corresponding to the additional video data; and embedding the additional video data into at least one frame of the source video data at least in part on the basis of the retrieved metadata to produce the output video data.

2. The method of claim 1, wherein the intermediate working version includes the selected one or more of the identified segments, and wherein the intermediate working version does not include one or more of the identified segments which are not selected for the inclusion of one or more additional video objects.

3. The method of claim 1, wherein the source video data is stored on a data store in a local area network in which the intermediate working version and the metadata are created, and wherein the remote system is connected to the local area network via the Internet, and wherein the step of transmitting the intermediate working version to the remote system comprises transmitting the intermediate working version to the remote system via the Internet.

4. The method of claim 1, further comprising transmitting to the remote system the metadata which identifies the at least one frame within the source video data which corresponds to the selected one or more segments.

5. The method of claim 4, further comprising receiving the metadata which identifies at least one frame within the source video data which corresponds to the additional video data.

6. The method of claim 5, wherein the metadata which identifies at least one frame within the source video data which corresponds to the additional video data is derived from the metadata which identifies the at least one frame within the source video data which corresponds to the selected one or more segments.

7. The method of claim 1, for use in a system including a plurality of remote systems which are capable of processing video data related to the creation of the additional video data before it is received for incorporation with the source video data, the method comprising:
generating remote system identification data identifying one or more remote systems which are to be involved in the processing of video data related to the creation of the additional video data; and
transmitting the remote system identification data to the remote system used for the creation of the additional video data.

8. The method of claim 7, wherein the remote system identification data comprises data identifying one or more tasks to be performed by the identified remote systems.

9. The method of claim 1, wherein the video file data comprises the additional video data and wherein obtaining the additional video data based on the video file data comprises retrieving the additional video data from the video file data.

10. The method of claim 1, wherein the video file data comprises instructions for generating the additional video data and wherein obtaining the additional video data based on the video data file comprises generating the additional video data using the instructions.

11. The method of claim 1, wherein the additional video data comprises video overlay data for generating video overlay material for incorporation with the source video data to produce the output video data.

12. The method of claim 11, further comprising rendering the video overlay, or video overlays, from the additional video data, and re-conforming the rendered video overlay, or video overlays, with the source video data to produce the output video data.

13. The method of claim 1, further comprising transmitting the source video data to a remote system which is different from the remote system used for the generation of the additional video data, and incorporating the received additional video data with the source video data at the different remote system.

14. The method of claim 1, further comprising carrying out a quality control check at a remote system which is different from the remote system used for the generation of the additional video data.

15. The method of claim 14, further comprising transmitting at least the intermediate working version to the remote system at which the quality control check is carried out.

16. The method of claim 1, further comprising analyzing the source video data to identify the segments of the source video data.

17. The method of claim 1, further comprising selecting a plurality of the identified segments of the source video data for the inclusion of the one or more additional video objects and not selecting at least one identified segment located between the selected plurality of identified segments in the source video for the inclusion of one or more additional video objects.

18. A system for embedding one or more additional video objects into at least one frame of source video data to produce output video data, comprising:
a memory configured to store the source video data; and
a processor configured to:
identify one or more segments of the source video data;
identify at least one similar segment within the source video data, the similar segment comprising a segment within the source video data that is similar to at least one of the identified one or more segments;
create a grouping of segments that includes the at least one of the identified one or more segments and the corresponding at least one similar segment;
select one or more of the segments within the grouping of segments for embedding one or more additional video objects into one or more individual frames of the source video data;
create an intermediate working version of the source video data, the intermediate working version including at least video material corresponding to the selected one or more segments, wherein the intermediate working version contains a reduced amount of video material compared to the source video data;
create metadata which identifies at least one frame within the source video data which corresponds to the selected one or more segments;
cause the system to transmit at least the intermediate working version to a remote system for creation of additional video data including the one or more additional video objects to be embedded in the output video data;
receive video file data associated with the additional video data after the additional video data has been created using the intermediate working version transmitted to the remote system;
obtain the additional video data based on the video file data;
retrieve metadata which identifies at least one frame within the source video data corresponding to the additional video data; and
embed the additional video data into at least one frame of the source video data at least in part on the basis of the retrieved metadata to produce the output video data.

19. A non-transitory computer-readable medium having computer-executable instructions stored thereon, which when executed by a computing device cause the computing device to perform a method of embedding one or more additional video objects into at least one frame of source video data to produce output video data, the method comprising:
- retrieving the source video data;
- identifying one or more segments of the source video data;
- identifying at least one similar segment within the source video data, the similar segment comprising a segment within the source video data that is similar to at least one of the identified one or more segments;
- creating a grouping of segments that includes the at least one of the identified one or more segments and the corresponding at least one similar segment;
- selecting one or more of the segments within the grouping of segments for embedding one or more additional video objects into one or more individual frames of the source video data;
- creating an intermediate working version of the source video data, the intermediate working version including at least video material corresponding to the selected one or more segments, wherein the intermediate working version contains a reduced amount of video material compared to the source video data;
- creating metadata which identifies at least one frame within the source video data which corresponds to the selected one or more segments;
- transmitting at least the intermediate working version to a remote system for creation of additional video data including the one or more additional video objects to be included in the output video data;
- receiving video file data associated with the additional video data after the additional video data has been created using the intermediate working version transmitted to the remote system;
- obtaining the additional video data based on the video file data;
- retrieving metadata which identifies at least one frame within the source video data corresponding to the additional video data; and
- embedding the additional video data into at least one frame of the source video data at least in part on the basis of the retrieved metadata to produce the output video data.

* * * * *